US008233149B2

(12) United States Patent
Kishima

(10) Patent No.: US 8,233,149 B2
(45) Date of Patent: Jul. 31, 2012

(54) BIOMETRIC IMAGE PICKUP APPARATUS

(75) Inventor: Koichiro Kishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 224 days.

(21) Appl. No.: 12/218,413

(22) Filed: Jul. 15, 2008

(65) Prior Publication Data

US 2009/0036783 A1 Feb. 5, 2009

(30) Foreign Application Priority Data

Jul. 30, 2007 (JP) ................................. 2007-197607

(51) Int. Cl.
*G01N 21/00* (2006.01)
(52) U.S. Cl. ........................................ 356/432; 356/433
(58) Field of Classification Search .......... 356/432–448, 356/450–458
See application file for complete search history.

(56) References Cited

U.S. PATENT DOCUMENTS

| 3,638,640 | A | * | 2/1972 | Shaw | 600/323 |
| 3,675,019 | A | * | 7/1972 | Hill et al. | 250/350 |
| 4,090,219 | A | * | 5/1978 | Ernstoff et al. | 348/742 |
| 4,655,225 | A | * | 4/1987 | Dahne et al. | 600/316 |
| 4,805,623 | A | * | 2/1989 | Jobsis | 600/328 |
| 5,277,181 | A | * | 1/1994 | Mendelson et al. | 600/322 |
| 5,372,136 | A | * | 12/1994 | Steuer et al. | 600/326 |
| 5,553,616 | A | * | 9/1996 | Ham et al. | 600/316 |
| 6,236,037 | B1 | * | 5/2001 | Asada et al. | 250/221 |
| 7,184,576 | B2 | * | 2/2007 | Kono et al. | 382/115 |
| 7,539,330 | B2 | * | 5/2009 | Rowe | 382/124 |
| 7,876,929 | B2 | * | 1/2011 | Matsumura et al. | 382/115 |
| 2002/0118865 | A1 | * | 8/2002 | Hosokawa | 382/124 |
| 2002/0183624 | A1 | | 12/2002 | Rowe et al. | |
| 2003/0099379 | A1 | * | 5/2003 | Monk et al. | 382/115 |
| 2009/0028396 | A1 | | 1/2009 | Kishima | |

FOREIGN PATENT DOCUMENTS

| JP | 63-047730 A | 2/1988 |
| JP | 10-127609 A | 5/1998 |
| JP | 2000-207535 A | 7/2000 |
| JP | 2000-253203 A | 9/2000 |
| JP | 2002-272744 A | 9/2002 |
| JP | 2004-049705 A | 2/2004 |
| JP | 2004-272821 A | 9/2004 |
| JP | 2005-500095 A | 1/2005 |
| JP | 2005-301552 A | 10/2005 |
| JP | 2007-102729 A | 4/2007 |
| WO | WO 2006/038276 A1 | 4/2006 |

* cited by examiner

*Primary Examiner* — Gregory J Toatley
*Assistant Examiner* — Jarreas C Underwood
(74) *Attorney, Agent, or Firm* — Wolf, Greenfield & Sacks, P.C.

(57) ABSTRACT

A biometric image pickup apparatus includes: a light source section selectively switching between light of a first wavelength region with a high transmittance through a living organism and light of a second wavelength region with a lower transmittance through the living organism than light of the first wavelength region to apply the light of the first wavelength region and the light of the second wavelength region to the living organism; an image pickup lens section condensing light from the living organism; an image pickup device obtaining first image pickup data of the living organism on the basis of the light of the first wavelength region in light condensed by the image pickup lens, and obtaining second image pickup data on the basis of the light of the second wavelength region in the light condensed by the image pickup lens.

8 Claims, 5 Drawing Sheets

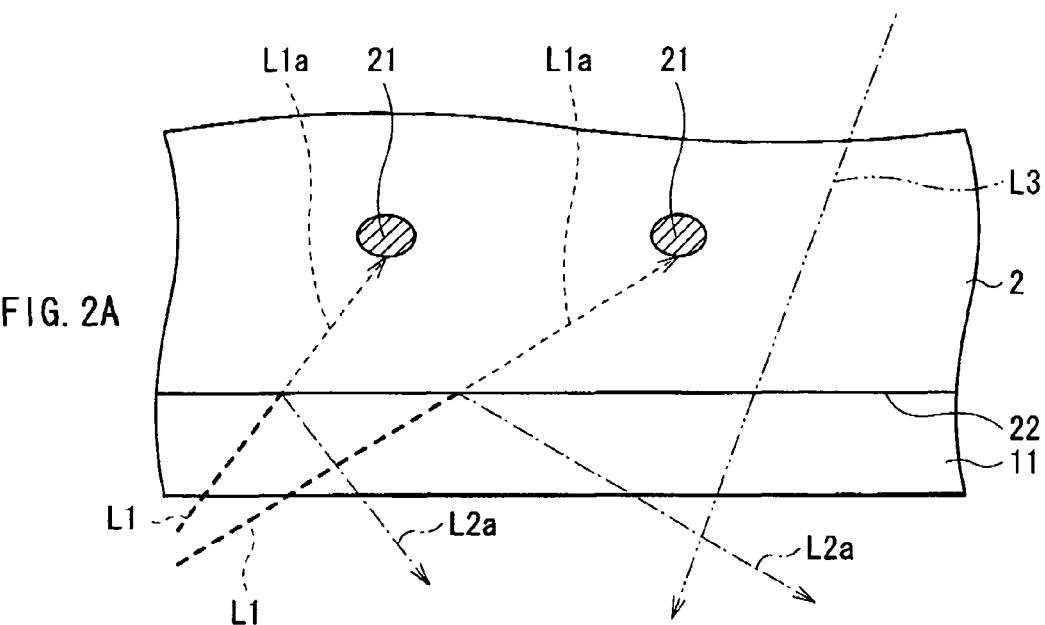
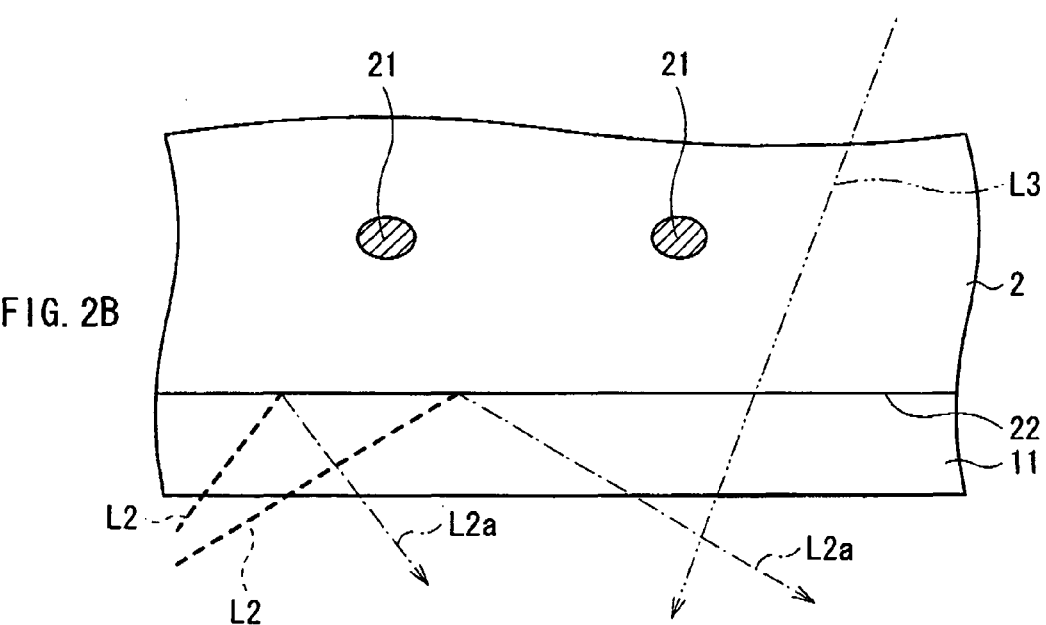

BIOMETRIC IMAGE PICKUP APPARATUS

CROSS REFERENCES TO RELATED APPLICATIONS

The present invention contains subject matter related to Japanese Patent Application JP 2007-197607 filed in the Japanese Patent Office on Jul. 30, 2007, the entire contents of which being incorporated herein by reference.

BACKGROUND OF THE INVENTION

1. Field of the Invention

The present invention relates to a biometric image pickup apparatus picking up, for example, an image of veins of a living organism.

2. Description of the Related Art

In recent years, the introduction of personal identification techniques (biometrics) using biometrics authentication into access control in a specific area or bank ATMs has begun. As such a method of identifying a living organism, methods using faces, fingerprints, voiceprints, irises, veins and the like as authentication data have been proposed. Among them, the shape pattern of veins under the skin of a finger or a palm hardly changes throughout a lifetime, and is information about the inside of a living organism, so it is difficult to forge, and the method using veins has high safety. Therefore, veins have been used frequently in biometrics authentication.

FIG. 5 shows a schematic view of a typical biometric image pickup apparatus. The biometric image pickup apparatus includes an upper cover 101 on which a light source 100 such as an LED (Light Emitting Diode) is mounted, a cover glass 102, an image pickup lens 103 and an image pickup device 104 such as a CCD (Charge Coupled Device) or a CMOS (Complementary Metal Oxide Semiconductor). In the biometric image pickup apparatus 100, when a living organism 2 is placed on the cover glass 102, and light passes through the living organism 2 from the top thereof, light is absorbed by blood hemoglobin flowing through veins. Thereby, contrast is changed inside the living organism 2, and a change in contrast is received by the image pickup device 104, thereby vein data of the living organism 2 is capable of being obtained.

When the vein data is obtained in such a manner, light is absorbed by hemoglobin in a living organism to pick up an image, so as the light source (illumination light) 100, a light source emitting light of a wavelength which has transmittance through a living organism and is easily absorbed by hemoglobin is typically used (for example, refer to Japanese Patent No. 3797454).

SUMMARY OF THE INVENTION

However, as described above, when light passing through a living organism is absorbed by hemoglobin, and thereby an image of veins is obtained, noises in image pickup data is produced by the influence of outside light such as so-called stray light or sunlight to cause a decline in the image quality of an obtained image.

In view of the foregoing, it is desirable to provide a biometric image pickup apparatus capable of reducing the influence of noises and improving the image quality of an obtained image.

According to an embodiment of the invention, there is provided a biometric image pickup apparatus including: a light source section selectively switching between light of a first wavelength region with a high transmittance through a living organism and light of a second wavelength region with a lower transmittance through the living organism than light of the first wavelength region to apply the light of the first wavelength region and the light of the second wavelength region to the living organism; an image pickup lens section condensing light from the living organism; an image pickup device obtaining first image pickup data of the living organism on the basis of the light of the first wavelength region in light condensed by the image pickup lens, and obtaining second image pickup data on the basis of the light of the second wavelength region in the light condensed by the image pickup lens; and an image processing section obtaining difference image data between the first image pickup data and the second image pickup data obtained by the image pickup device.

In the biometric image pickup apparatus according to the embodiment of the invention, when the light of the first wavelength region and the light of the second wavelength region are applied to the living organism, light reaching the inside of the living organism is absorbed by the inside of the living organism, and the first image pickup data and the second image pickup data each including the shape pattern of the inside of the living organism are obtained. At this time, as the light of the first wavelength region has a higher transmittance than the light of the second wavelength region, in the first image pickup data, the signal level in the shape pattern of the inside of the living organism is higher than that in the second image pickup data. On the other hand, the first image pickup data and the second image pickup data each include a signal component of stray light or outside light; however, the signal components in the first image pickup data and the second image pickup data have substantially the same pattern and substantially the same signal level. Therefore, in the image processing section, difference image data between the first image pickup data and the second image pickup data is obtained, thereby image data of the shape pattern of the inside of the living organism in which the shape pattern of the inside of the living organism remains, and the signal component of stray light or outside light is almost removed is obtained.

Moreover, in the case where the light source is arranged on the same side as a side where the image pickup device is arranged to apply light to the bottom surface of the living organism, light reflected by the surface (skin) of the living organism is received by the image pickup device to cause noises. In such a case, a signal component of reflected light included in the first image pickup data and a signal component of reflected light included in the second image pickup data are substantially the same as each other, so when difference image data between them is obtained, the signal component of the reflected light is removed.

In the biometric image pickup apparatus according to the embodiment of the invention, the light of the first wavelength region with a high transmittance through the living organism and the light of the second wavelength region with a lower transmittance through the living organism than the light of the first wavelength region are applied to the living organism, so while the signal level of the shape pattern of the inside of the living organism in the first image pickup data is higher than that in the second image pickup data, the signal components of stray light or outside light in the first and second image pickup data are substantially the same as each other. Therefore, when difference image data between the first image pickup data and the second image pickup data is obtained, data of the shape pattern of the inside of the living organism remains, and the signal component of stray light or outside light is removed, so the influence of noises is able to be reduced, and the image quality of an obtained image is able to be improved.

Moreover, in the case where the light source is arranged on the same side as a side where the image pickup device is arranged to apply light to the bottom side of the living organism, light reflected by the surface (skin) of the living organism is received by the image pickup device, but signal components of the reflected light in the first and second image pickup data are substantially the same as each other. Therefore, when difference image data between them is obtained, the signal component of the reflected light is removed. Therefore, irrespective of a system of applying light to the living organism, the influence of noises is able to be reduced. Moreover, as the light source is arranged on the same side as the side where the image pickup device is arranged, a reduction in the profile of the whole system is able to be achieved.

Other and further objects, features and advantages of the invention will appear more fully from the following description.

BRIEF DESCRIPTION OF THE DRAWINGS

FIGS. 2A and 2B are schematic views for describing a light ray received by an image pickup device, and FIG. 2A shows the case where light of a first wavelength region is applied, and FIG. 2B shows the case where light of a second wavelength region is applied;

DETAILED DESCRIPTION OF THE PREFERRED EMBODIMENTS

A preferred embodiment will be described in detail below referring to the accompanying drawings.

Figure 1:
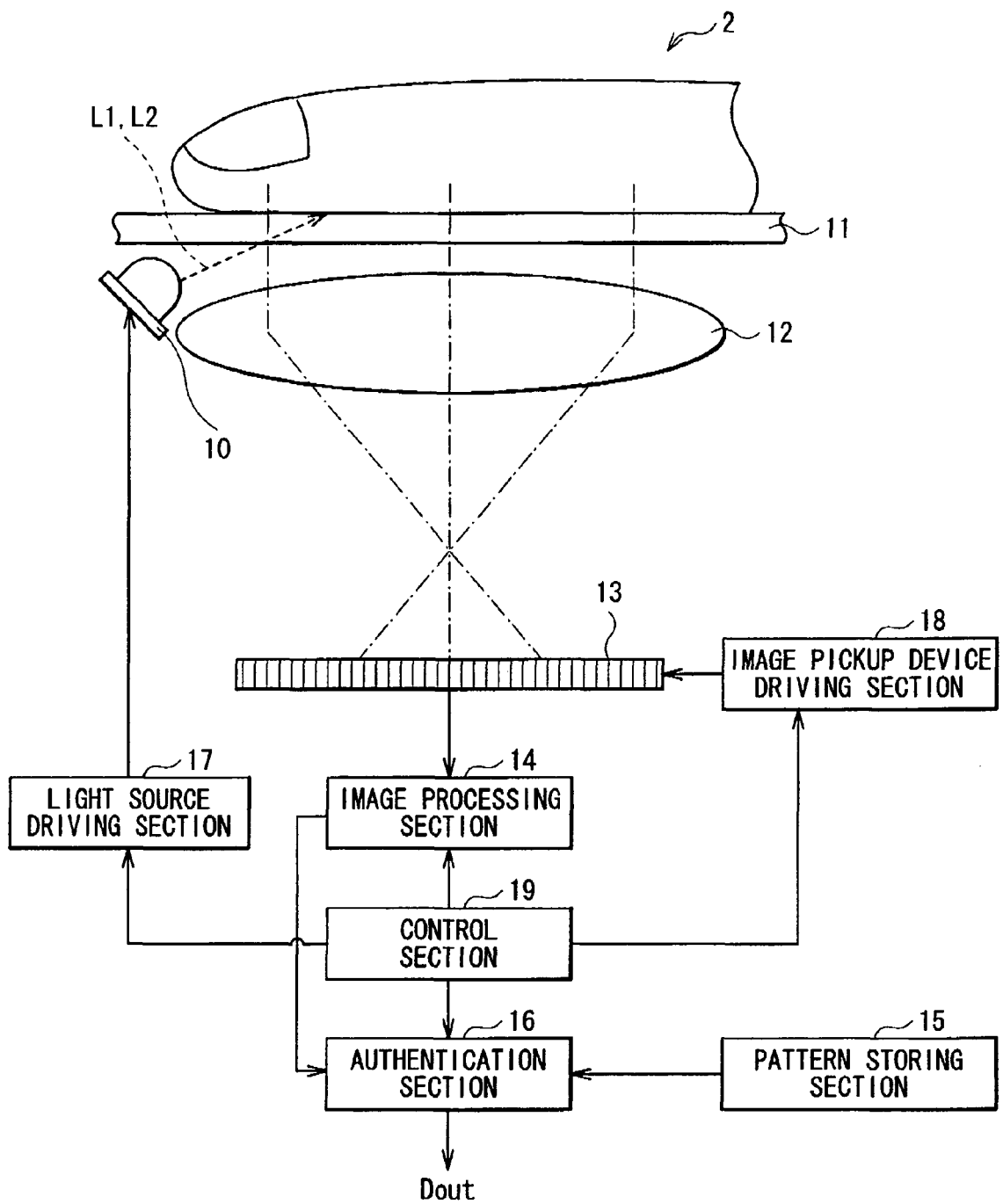
FIG. 1 is a block diagram showing the whole configuration of a biometrics authentication system according to a first embodiment of the invention.

FIG. 1 shows the whole configuration of a biometrics authentication system 1 according to an embodiment of the invention. The biometrics authentication system 1 picks up an image of a living organism (for example, a fingertip) 2 as an object subjected to image pickup to perform the authentication of the living organism 2, and then outputs authentication result data Dout, and the biometrics authentication system 1 includes a light source 10, a glass substrate 11, an image pickup lens 12, an image pickup device 13, an image processing section 14, a pattern storing section 15, an authentication section 16, a light source driving section 17, an image pickup device driving section 18 and a control section 19.

The light source 10 is arranged on the same side as a side where the image pickup device 13 is arranged with respect to, for example, a surface (a detection section in the embodiment of the invention) of the glass substrate 11 which will be described later, and is capable of applying light to the living organism 2 as an object subjected to image pickup from the bottom side of the living organism 2. As the light source 10, for example, an LED or the like is applicable, and the light source 10 selectively emits light of two different wavelength regions by the drive of the light source driving section 17 in response to the control section 19 which will be described later. As an illumination device emitting light of two different wavelength regions, a device in which optical fibers connected to two light sources are bundled, a device in which two light sources of different wavelength regions are connected to a light guide plate or the like is applicable.

More specifically, the light source 10 selectively emits light L1 of a wavelength region (a first wavelength region) with a high transmittance through the living organism 2 and light L2 of a wavelength region (a second wavelength region) with a low transmittance through the living organism 2. The light L1 is, for example, near-infrared light of a wavelength region from 700 nm to 1200 nm, and is light absorbed by hemoglobin in veins. The light L1 is preferably light of a wavelength region with high absorption by hemoglobin, for example, a wavelength from 830 nm to 860 nm. On the other hand, the light L2 is, for example, visible light or ultraviolet light of a shorter wavelength than 700 nm, or light of a higher wavelength than 1200 nm, and is light of a wavelength region which is easily reflected by the surface of the living organism 2.

The wavelength of light emitted from the light source 10 is set to fall in a wavelength range which is receivable by the image pickup device 13 which will be described later. For example, in the case where the image pickup device 13 is made of a silicon (Si)-based material, the wavelengths of the light L1 and the light L2 are necessary to be approximately 1100 nm or less. Therefore, for example, light of a wavelength of 860 nm as the light L1 and light of a wavelength of 650 nm as the light L2 may be used.

The glass substrate 11 is a position where the living organism 2 is placed at the time of image pickup, and is a cover glass for protecting the interior such as the image pickup lens 12 or the image pickup device 13 of the system. The surface of the glass substrate 11 is a detection section for detecting the living organism 2 in the embodiment of the invention.

The image pickup lens 12 is a refractive lens for condensing light inside the living organism 2, and is made of, for example, a glass lens, a plastic lens, a liquid lens, a liquid crystal lens or the like. The image pickup lens 12 is arranged on the lower side of the glass substrate 11 so that an image of a predetermined observation plane (a plane subjected to image pickup) in the living organism 2 is formed on a light-sensing surface on the image pickup device 13 which will be described later.

The image pickup device 13 receives light condensed by the image pickup lens 12 to obtain image pickup data. The image pickup device 13 includes a plurality of solid-state imaging devices such as CCDs or CMOSs arranged in a matrix form. In the embodiment, image pickup data (first image pickup data and second image pickup data) according to the light L1 and the light L2 of different wavelength regions emitted from the light source 10 are obtained. The image pickup device 13 is typically made of a silicon-based material, and a receivable wavelength region in this case is, for example, approximately 1100 nm or less.

The image processing section 14 performs predetermined image processing on the image pickup data obtained by the image pickup device 13 in response to the control of the control section 19 to output the image pickup data to the authentication section 16. More specifically, a comparison operation between the image pickup data obtained on the basis of the light L1 from the light source 10 and the image pickup data obtained on the basis of the light L2 is performed to determine a difference between them by calculation, thereby difference image data is obtained. In addition, the image processing section 14, and the authentication section 16 and the control section 19 which will be described later each include, for example, a microcomputer or the like.

The pattern storing section 15 is a section storing a biometrics authentication pattern (which is a comparison pattern relative to an image pickup pattern obtained at the time of authentication, and which is obtained by picking up an image of a living organism in advance), and includes a nonvolatile memory device (for example, an EEPROM (Electrically Erasable Programmable Read Only Memory) or the like). The authentication section 16 is a section performing the authentication of the living organism 2 as an object subjected to image pickup by comparing an image pickup pattern outputted from the image processing section 14 to the biometrics authentication pattern stored in the pattern storing section 15 in response to the control of the control section 19.

The light source driving section 17 drives the light source 10 to selectively switch between the light L1 and the light L2 in response to the control of the control section 19 to emit the light L1 and the light L2. The image pickup device driving section 18 drives the image pickup device 13 to pick up an image (to receive light) in response to the control of the control section 19. The control section 19 controls the operations of the image processing section 14, the authentication section 16, the light source driving section 17 and the image pickup device driving section 18.

Next, the operation (a biometrics authentication process) of such a biometrics authentication system 1 will be described below. FIG. 2A is a schematic view for describing a light ray received by the image pickup device 13 in the case where the light L1 is applied, and FIG. 2B is a schematic view for describing a light ray received by the image pickup device 13 in the case where the light L2 is applied.

In the biometrics authentication system 1, at first, when the living organism (for example, a fingertip) 2 is placed on the glass substrate 11, and, for example, the light L1 is emitted from the light source 10 by the drive of the light source driving section 17, the light L1 is applied to the living organism 2 from the bottom surface of the glass substrate 11. At this time, the light L1 is light of a wavelength region with a high transmittance through the living organism 2, so the light L1 reaches the inside of the living organism 2, and is absorbed by hemoglobin flowing through veins. Thereby, a region corresponding to veins in the living organism 2 becomes dark by light absorption, and contrast in the living organism 2 is changed. On the other hand, as the image pickup lens 12 is arranged so that an image of a predetermined observation plane in the living organism 2 is formed on the light-sensing surface of the image pickup device 13, a change in contrast caused by light absorption in the living organism 2 is received by the image pickup device 13, thereby image pickup data of a vein pattern is obtained.

The image pickup data obtained in such a manner is outputted to the image processing section 14, and the image processing section 14 performs predetermined image processing which will be described later on the image pickup data so as to obtain image data of the vein pattern, and then the image data of the vein pattern is outputted to the authentication section 16. The authentication section 16 performs the authentication of a living organism by determining if there is a match between the authentication pattern for vein authentication stored in the pattern storing section 15 and the obtained vein pattern. Then, a final biometrics authentication result (authentication result data Dout) is outputted, thereby the biometrics authentication process is completed.

As shown in FIG. 2A, light received by the image pickup device 13 includes light from the inside of the living organism 2 as well as light emitted from the light source 10 and then reflected by a wall or the like of the interior of the system, or light L3 such as so-called stray light or outside light including sunlight, interior light or the like. Moreover, as light is applied from the image pickup device 13 side to the bottom surface of the living organism 2, the light L1 emitted from the light source 10 includes light L1a reaching the inside of the living organism 2 as well as light L2a reflected by a surface (skin) 22 of the living organism 2. Therefore, in the case where the light L1 is applied to the living organism 2, in reality, the image pickup device 13 receives not only light from the inside of the living organism 2 which is necessary to obtain a vein pattern but also reflected light L2a from the surface 22 of the living organism 2 or the light L3 such as stray light or outside light. Therefore, image pickup data (first image pickup data) in the case where the light L1 is applied includes a signal component of the reflected light L2a or the light L3 in addition to the data of the vein pattern.

On the other hand, when light L2 with a low transmittance through the living organism 2 is emitted from the light source 10 by the drive of the light source driving section 17, as shown in FIG. 2B, the light L2 is reflected by the surface 22 of the living organism 2, and enters into the image pickup device 13 as reflected light L2a. Moreover, as in the case shown in FIG. 2A, the light L3 such as stray light or outside light exists, so in the case where the light L2 is applied, the reflected light L2a from the surface 22 of the living organism 2 and the light L3 are received by the image pickup device 13, and the data of the light L2a and L3 is obtained as image pickup data (the second image pickup data).

At this time, a received-light image of the reflected light L2a or the light L3 in the case where the light L1 is applied and a received-light image of the reflected light L2a or the light L3 in the case where the light L2 is applied are substantially the same under the same environment on a light-sensing surface of the image pickup device 13. Therefore, a signal component of the reflected light L2a or the light L3 in the image pickup data in the case where the light L1 is applied and the image pickup data in the case where the light L2 is applied have substantially the same pattern and substantially the same signal level. Therefore, in the image processing section 14, a comparison operation between the image pickup data in the case where the light L1 is applied and the image pickup data in the case where the light L2 is applied is performed to determine a difference between them by calculation, and then difference image data is obtained, thereby a signal component of noise light is almost removed, and data of the vein pattern remains.

As described above, in the biometrics authentication system 1 according to the embodiment, the light source 10 selectively switches between the light L1 with a high transmittance through the living organism 2 and the light L2 with a low transmittance through the living organism 2 to apply the light L1 and the light L2 to the living organism 2, so image pickup data including the vein pattern and the signal component of stray light or outside light and image pickup data including substantially the same data as the signal component of stray light or outside light are obtained. Therefore, in the image processing section 14, difference image data between these image pickup data is obtained, thereby while data of the vein pattern remains, the signal component of noise light is almost removed. Therefore, the influence of noises is able to be reduced, and the image quality of an obtained image is able to be improved. Further, authentication precision is improved accordingly.

In particular, the light source 10 is arranged on the same side as a side where the image pickup device 13 is arranged, and applies light to the bottom surface of the living organism 2, thereby the image pickup device 13 also receives the reflected light L2a reflected by the living organism 2; however, a signal component of the reflected light L2a in the case where the light L1 is applied has substantially the same pattern and substantially the same signal level as that in the case where the light L2 is applied, so the signal component of the reflected light L2a is almost removed as in the case of the signal component of the light L3. Therefore, irrespective of a system of applying light to the living organism 2, the influence of noises is able to be reduced. Moreover, the light source 10 is arranged on the same side as a side where the image pickup device 13 is arranged, so a reduction in the profile of the whole system is able to be achieved.

Modification

Figure 3:
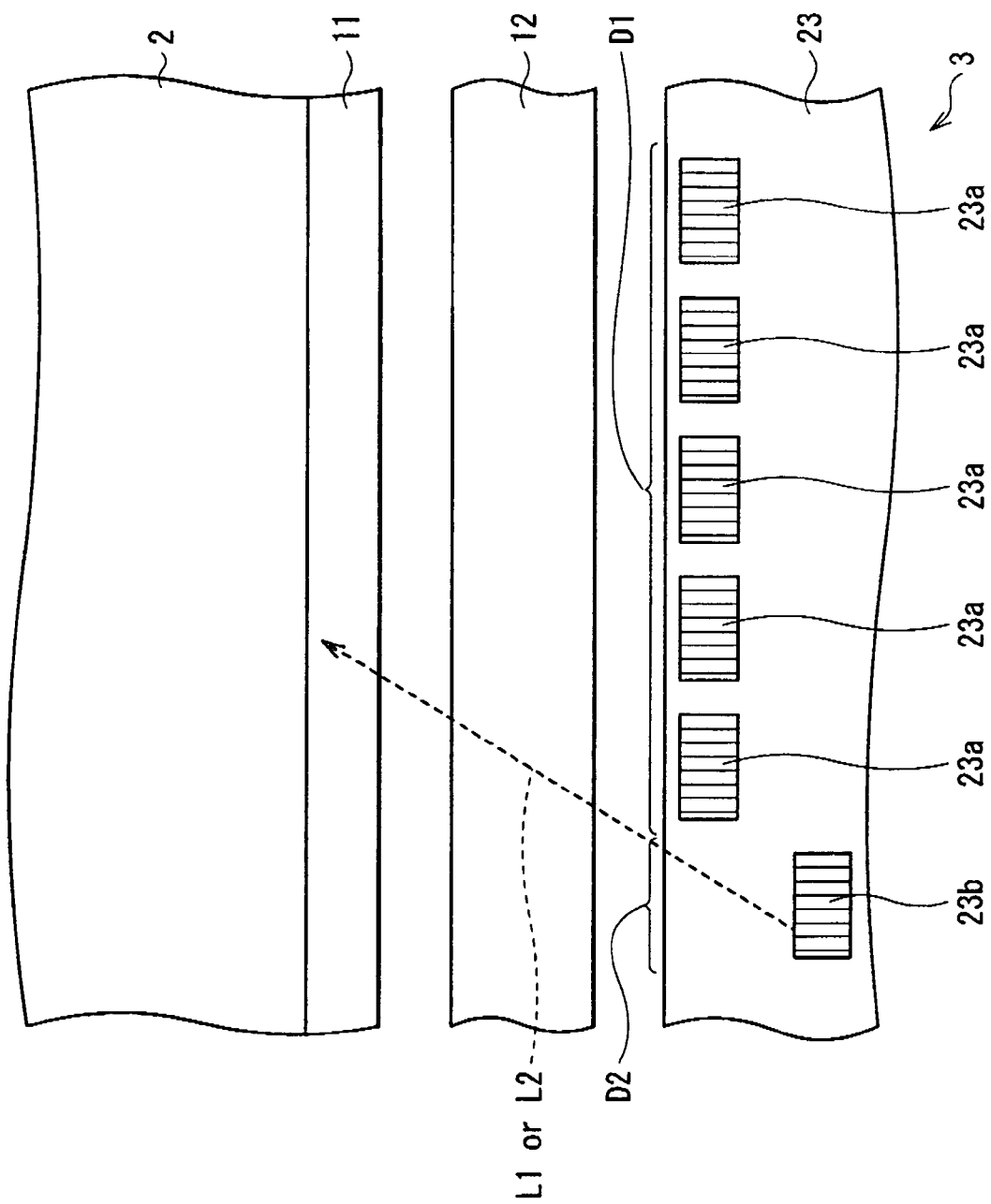
FIG. 3 is a schematic sectional view of a biometrics authentication system according to a modification of the invention.
Figure 4A:
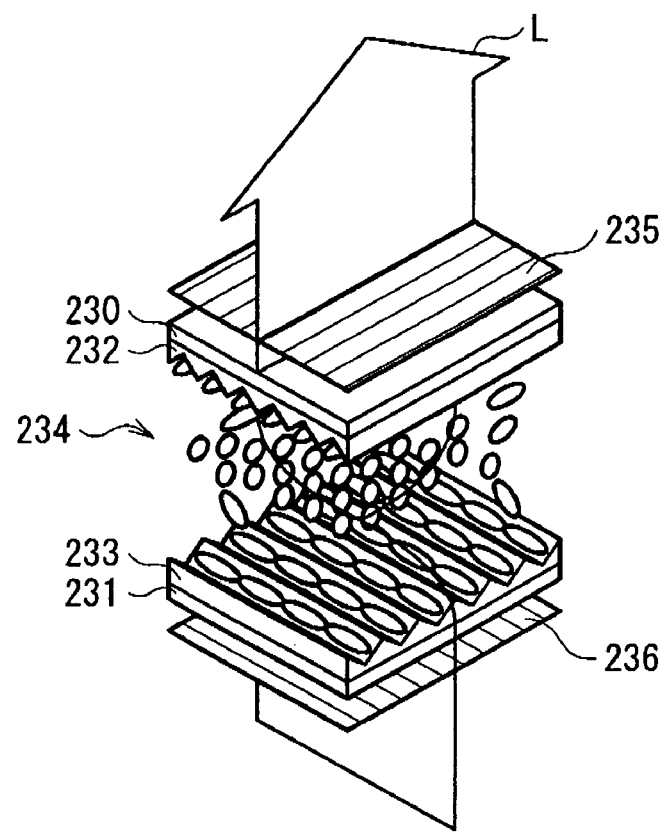
FIGS. 4A and 4B are schematic perspective views showing a light source cell of the biometrics authentication system shown in FIG. 3.

Next, a modification of the present invention will be described below referring to FIGS. 3, 4A and 4B. FIG. 3 shows a schematic view of a biometrics authentication system 3 according to the modification. FIG. 4A is a schematic view showing a light transmission state in the case where a voltage is not applied to a liquid crystal cell, and FIG. 4B is a schematic view showing a light transmission (blocking) state in the case where a voltage is applied to a liquid crystal cell.

The biometrics authentication system 3 has the same configuration as that of the biometrics authentication system 1 shown in FIG. 1, except for a light source and an image pickup device. Therefore, like components are denoted by like numerals as of the above-described biometrics authentication system 1, and will not be further described. For the purpose of simplification, configurations corresponding to the image processing section 14, the pattern storing section 15, the authentication section 16, the light source driving section 17, the image pickup device driving section 18 and the control section 19 in FIG. 1 are not shown in the drawings.

As shown in FIG. 3, in the biometrics authentication system 3, image pickup cells 23a and a light source cell 23d are regularly arranged in an image pickup device 23. The image pickup device 23 includes, for example, an image pickup region D1 in which a plurality of image pickup cells 23a are formed and a non-image pickup region D2 where image pickup cells 23a are not formed, and a light source cell 23b is formed in a region corresponding to the non-image pickup region D2 of the image pickup device 23. The light source cell 23b includes a light source such as an LED capable of selectively switching between the above-described light L1 and the above-described light L2 to emit the light L1 and the light L2, and a typical liquid crystal cell (a liquid crystal display device).

Figure 4B:
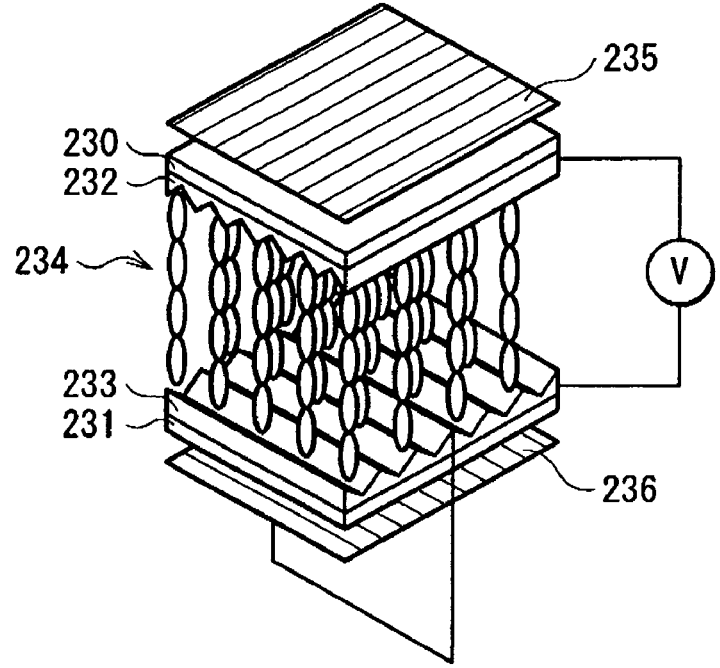
Figure 5:
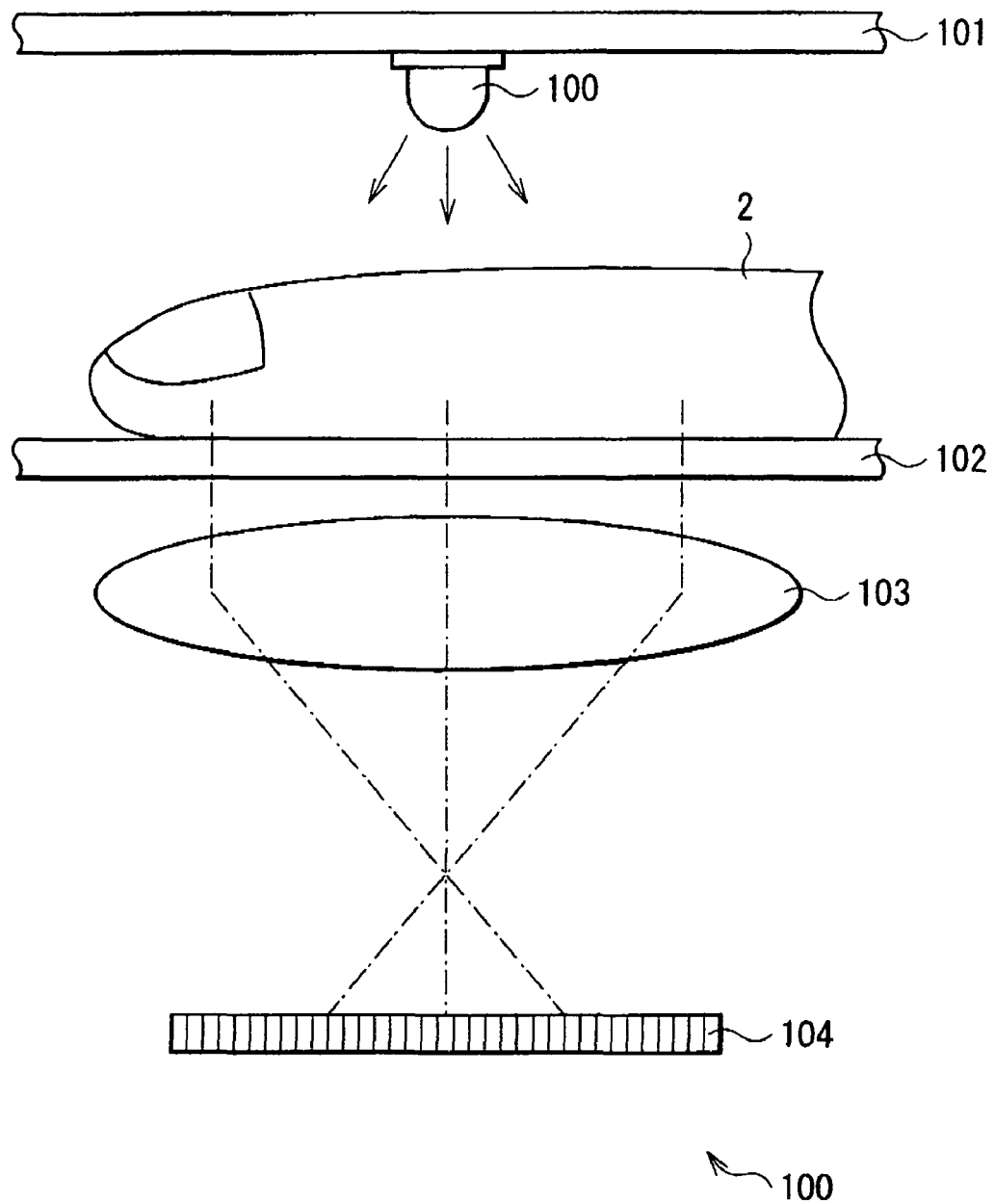
FIG. 5 is a schematic sectional view of a biometric image pickup apparatus in a related art.

As shown in FIGS. 4A and 4B, in the liquid crystal cell, a liquid crystal layer 234 is sealed between a pair of substrates 230 and 231 made of glass or the like with transparent electrodes 232 and 233 in between, and a pair of polarization filters 235 and 236 are bonded to outer sides of the substrates 230 and 231, respectively. In the modification, a pair of polarization filters 235 and 236 are arranged so that the polarizing axes thereof are orthogonal to each other. Moreover, as the light source of the liquid crystal cell, for example, an LED (not shown) or the like is arranged on the bottom surface of the polarization filter 236. At this time, a light guide plate (not shown) is arranged on the whole surface opposite to the light-sensing surface of the image pickup device 23, thereby light from one LED is able to be taken out from a plurality of liquid crystal cells (light source cells 23b).

The light source cell 23b with the above-described configuration is able to be driven by a voltage applied between the transparent electrodes 232 and 233 of the liquid crystal cell so as to switch between transmission and blocking of light. In other words, as shown in FIG. 4A, light passes through in a state in which a voltage is not applied, and as shown in FIG. 4B, light is blocked in a state in which a voltage is applied. Moreover, when a voltage is switched per light source cell 23b to be applied, a plurality of light source cells 23b are able to be driven independently.

Although the present invention is described referring to the embodiment, the invention is not limited to the embodiment, and may be variously modified. For example, in the above-described embodiment, the configuration in which one light source selectively switches between two kinds of light, that is, the light of a wavelength region with a high transmittance through the living organism and the light of a wavelength region with a low transmittance through the living organism to emit the two kinds of light is described as an example; however, the invention is not limited to the configuration, and a configuration in which a light source emitting light of a wavelength region with a high transmittance through the living organism and a light source emitting light of a wavelength region with a low transmittance through the living organism are arranged, and the light sources are selectively driven to emit light of each wavelength region may be used. However, in this case, a plurality of light sources are preferably arranged in the same position if possible. When the positions of the light sources are different, a received-light image of reflected light from the skin or outside light is different, and it is difficult to remove the influence of noises.

Moreover, in the above-described embodiment, the configuration in which two kinds of light, that is, the light of a wavelength region with a high transmittance through the living organism and the light of a wavelength region with a low transmittance through the living organism are used to obtain image pickup data is described as an example; however, the invention is not limited to the configuration, and even if three or more kinds of light of different wavelength regions are used, the effects of the invention may be achieved.

Further, in the above-described embodiment, the configuration in which the light of a wavelength region with a high transmittance through the living organism and the light of a wavelength region with a low transmittance through the living organism are used, and only one image pickup data includes data of a vein pattern is described as an example; however, the invention is not limited to the configuration, and as long as one light has a higher transmittance through the living organism than the other light, both of them may pass through the living organism. Even in such a configuration, while the signal components such as stray light or outside light included in these image pickup data are the same as each other, the signal levels of the obtained vein patterns in these image pickup data are different from each other, so by taking a difference between these image pickup data, the signal component such as stray light or outside light is removed, and the data of the vein pattern remains, thereby image data of the vein pattern in which the influence of noises is reduced is obtained.

In the above-described embodiment, a single lens is described as an example of the image pickup lens; however, the image pickup lens is not limited to the single lens, and a microlens array including a plurality of microlenses arranged in a matrix form may be used as the image pickup lens, and data picked up by the microlenses may be combined in the image processing section. In this case, the condensing efficiency may be improved, thereby high signal strength may be obtained. Alternatively, when the condensing efficiency is improved, the size of the light-sensing device may be reduced, so an increase in the resolution of an obtained image may be achieved.

In the above-described embodiment, in the biometrics authentication system according to the modification, the case where the liquid crystal cell of the light source cell 23b blocks light in a state in which a voltage is applied, and passes light through in a state in which a voltage is not applied is described; however, the invention is not limited to the case, and even if the relationship between the application of a voltage and transmission and blocking of light is opposite, the effects of the invention may be achieved.

In the above-described embodiment, the configuration in which the light source is arranged on a side closer to the image pickup device, and light is applied to the bottom surface of the living organism is described as an example; however, the invention is not limited to the configuration, and the light source may be arranged so as to face the image pickup device with the living organism in between, and light may be applied to the top surface of the living organism. Even in such a configuration, the influence of reflected light from the skin is not exerted, and the influence of outside light such as sunlight or interior light is able to be removed, so the effects of the invention may be achieved. Moreover, the position of the light source and the number of light sources are not limited to the above-described embodiment.

In the above-described embodiment, the configuration in which light from the light source is directly applied to the living organism is described as an example; however, the invention is not limited to the configuration, and, for example, the invention is applicable to the configuration in which light emitted from the light source propagates through a light guide plate or the like to be applied to the living organism.

In the above-described embodiment, a biometric authentication system performing the authentication of the living organism on the basis of image data of veins of the living organism is described as a biometric image pickup apparatus; however, the invention is not limited to this, and authentication may be performed on the basis of image data of any other structure in the living organism. The invention is applicable to not only the biometrics authentication system but also any other image pickup apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A biometric image pickup apparatus comprising:
a light source section including a light source configured to receive a driving signal from a light source driving section, wherein the driving signal when received causes the light source to selectively switch between outputting a first light of a first wavelength region with a high transmittance through a living organism to image a vein pattern of the living organism and second light of a second wavelength region with a lower transmittance through the living organism than the first light of the first wavelength region to apply the first light of the first wavelength region and the second light of the second wavelength region to the living organism, wherein the light source section further includes a liquid crystal device selectively switchable between transmission and blocking of light from the light source;

an image pickup lens section configured to condense transmitted light from the living organism;

an image pickup device configured to obtain first image pickup data of the living organism on the basis of the light of the first wavelength region in the transmitted light condensed by the image pickup lens section and second image pickup data on the basis of the light of the second wavelength region in the transmitted light condensed by the image pickup lens section, wherein the first image pickup data comprises vein pattern information and at least one source of noise and the second image pickup data comprises the at least one source of noise, wherein the at least one source of noise comprises stray light generated from a source outside of the living organism other than the light source in the light source section and light reflected at or near an incident surface of the living organism; and an image processing section configured to determine difference image data between the first image pickup data and the second image pickup data obtained by the image pickup device, wherein the difference image data excludes, at least in part, the at least one source of noise.

2. The biometric image pickup apparatus according to claim 1, wherein
the first wavelength region is a wavelength region from 700 nm to 1200 nm inclusive.

3. The biometric image pickup apparatus according to claim 1, wherein
the second wavelength region is a wavelength region smaller than 700 nm or larger than 1200 nm.

4. The biometric image pickup apparatus according to claim 1, further comprising:
a detection section where the living organism is placed, wherein the light source section is arranged on the same side as a side where the image pickup device is arranged with respect to the detection section.

5. The biometric image pickup apparatus according to claim 1, wherein the image pickup device includes an image pickup region in which a plurality of image pickup cells are formed, and a non-image pickup region in which the image pickup cells are not formed, and
the light source section is arranged in the non-image pickup region of the image pickup device.

6. The biometric image pickup apparatus according to claim 1, wherein
the difference image data obtained by the image processing section is image data about veins of the living organism.

7. The biometric image pickup apparatus according to claim 1, further comprising:
an authentication section performing the authentication of the living organism on the basis of the difference image data obtained by the image processing section.

8. The biometric image pickup apparatus according to claim 1, wherein the at least one source of noise comprises sunlight.

* * * * *